United States Patent
Sternberg et al.

(10) Patent No.: US 8,081,318 B2
(45) Date of Patent: Dec. 20, 2011

(54) NON-PERIODIC WAVEFRONT DIVIDING INTERFEROMETER

(75) Inventors: Oren Sternberg, Leesburg, VA (US); Kenneth P Stewart, Upper Marlboro, MD (US); Brian C Hicks, Alexandria, VA (US); Haim Grebel, Livingston, NJ (US); Karl Dieter Moeller, Neptune, NJ (US)

(73) Assignees: The United States of America as represented by the Secretary of the Navy, Washington, DC (US); New Jersey Institute of Technology, Newark, NJ (US)

( * ) Notice: Subject to any disclaimer, the term of this patent is extended or adjusted under 35 U.S.C. 154(b) by 363 days.

(21) Appl. No.: 12/481,648

(22) Filed: Jun. 10, 2009

(65) Prior Publication Data
US 2010/0315648 A1     Dec. 16, 2010

(51) Int. Cl.
*G01B 9/02* (2006.01)
(52) U.S. Cl. .................................................. 356/521
(58) Field of Classification Search .............. 356/451, 356/452, 521; 359/558, 565, 568, 576, 575, 359/580, 583
See application file for complete search history.

(56) References Cited

U.S. PATENT DOCUMENTS

| | | | |
|---|---|---|---|
| 5,258,871 A * | 11/1993 | Gupta | 359/489.06 |
| 5,777,736 A * | 7/1998 | Horton | 356/456 |
| 7,245,432 B2 * | 7/2007 | Shahar | 359/576 |
| 7,864,325 B2 * | 1/2011 | Suzuki et al. | 356/450 |
| 2009/0052619 A1 * | 2/2009 | Endoh | 378/43 |

OTHER PUBLICATIONS

Bruelemans. P., et al., 'Wave-front-dividing circular-reflector interferometer for the far infrared', Applied Optics, vol. 35, No. 22, Aug. 1, 1996, pp. 4337-4342.
Möller, K.D., 'Wavefront Dividing Interferometers'. Infrared Physics, vol. 32, 1991, pp. 321-331.

* cited by examiner

*Primary Examiner* — Michael A Lyons
(74) *Attorney, Agent, or Firm* — Amy L. Ressing; L. George Legg

(57) ABSTRACT

A non-periodic reflection beamsplitter or reflector for use in an interferometer. The interferometer employs non-periodic reflectors or a non-periodic beamsplitter in order to produce interference patterns to analyze. The non-periodic reflectors or beamsplitters may be concentrically arranged reflectors having equal area. The beamsplitter consists of two adjacent non-periodic structures having complementary reflection and transmission patterns.

22 Claims, 13 Drawing Sheets

NON-PERIODIC WAVEFRONT DIVIDING INTERFEROMETER

BACKGROUND OF THE INVENTION

1. Field of the Invention

The present invention relates to the field of interferometry. In particular the present invention relates to non-periodic, wavefront-dividing interferometers that increase efficiency.

2. Description of the Related Technology

A schematic of a Michelson Fourier Transform (FT) interferometer 10 is shown in FIG. 1. Michelson FT spectrometers are amplitude-dividing interferometers using dielectric beamsplitters. In FIG. 1 the incident light enters the interferometer and contacts the beamsplitter 12 and two mirrors 11 that transmit the light to a detector 18. The detector 18 is operatively connected to amplifier 4 and a computer 5 that can calculate the Fourier transform. An ideal beamsplitter for use in a Michelson FT interferometer transmits 50% of the light and reflects 50% of the incident light beam. This maximum-efficiency situation gives the highest signal-to-noise ratio in the detected signal while using a minimum measurement time. While the usage of the Michelson FT interferometer with dielectric beamsplitters is effective for limited spectral regions, since its introduction in the 1950s attempts to design a beamsplitter that operates over a large spectral region have been unsuccessful.

Due to the lack of beamsplitters that are able to accommodate a large range of wavelengths, when measuring a range of wavelengths the beamsplitter has to be replaced when wavelengths not accommodated by the installed beamsplitter are required. The process of replacing beamsplitters is inconvenient and time consuming because the beamsplitters must be aligned with a high degree of accuracy in a Michelson FT interferometer. For example, the commercial Bruker Fourier transform infrared spectrometer uses five different beamsplitters in order to cover the THz through infrared spectral region. The changing of beamsplitters is inconvenient in general and especially so for flight instruments and portable ground-based instruments.

In addition to the Michelson FT interferometer, another type of interferometer is the wavefront dividing interferometer 15 shown in FIG. 2. In the wavefront dividing interferometer 15 the incident light strikes two sets of reflectors 14 and 16. The reflectors are displaced with respect to one another to produce an interferogram. The light is then reflected back to a detector 18. When using a wavefront dividing interferometer 15 there is no need to use beamsplitters. This has obvious advantages in reducing the number of components used in the interferometer, however the efficiency of the light transmission may not be ideal.

Therefore, there is a need in the field for an interferometer that enables usage over a large range of wavelengths and obviates the need for replacement or adjustment to the interferometer.

SUMMARY OF THE INVENTION

An object of the invention is to provide an improved interferometer that is able to efficiently transmit 50% of incident light and reflect 50% of incident light.

Another object of the invention is to provide non-periodic reflection means.

Yet another object of the invention is the ability to use the interferometer over a large range of frequencies.

In one aspect, the present invention is an interferometer comprising: a beamsplitter for receiving light comprising; a first zone plate having a first set of transmission zones and a first set of reflection zones; a second zone plate, wherein the second zone plate is located adjacent said first zone plate, the second zone plate having a second set of transmission zones and a second set of reflection zones; a mirror for receiving reflected and transmitted light from the beamsplitter; a detector for receiving the light from the beamsplitter; a computer operatively connected to the detector, wherein the computer analyzes interference patterns produced by the light; and wherein the first set of transmission zones transmits the light to the mirror and the light is reflected by the second set of reflection zones, wherein the area of the first set of transmission zones is the same as the area of the second set of reflection zones.

Another aspect of the invention is an interferometer comprising: a first set of reflectors and a second set of reflectors; wherein the first set of reflectors and the second set of reflectors are not periodic; a detector for receiving light from the first reflector and the second reflector; and a computer operatively connected to the detector, wherein the computer analyzes interference patterns produced by the light.

Still another aspect of the invention is an interferometer comprising: non-periodic reflection means for receiving light; a detector for detecting the light after reflection by the non-periodic reflection means; and a computer operatively connected to the detector, wherein the computer analyzes interference patterns produced by the light.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 5b is a graph of the angular dependence of the diffraction pattern produced by the interferometer shown in FIG. 5a.

FIG. 9 is a graph of the constructive interference produced by the non-periodically arranged reflectors shown in FIG. 5a.

FIG. 10 is a graph of the destructive interference produced by the non-periodically arranged reflectors shown in FIG. 5a.

DETAILED DESCRIPTION OF THE PREFERRED EMBODIMENT(S)

An embodiment of the present invention is a wavefront dividing non-periodic ring interferometer that does not require a beamsplitter. Not requiring a beamsplitter renders the interferometer advantageous in some ways relative to interferometers, such as Michelson and Mach-Zehnder types, that require beamsplitters. In a wavefront dividing interferometer only two parts need to be employed and these two parts move with respect to one another in a self-aligning fashion via their mechanical construction. A periodic wavefront dividing interferometer is first discussed below referring to FIGS. 3, 4a and 4b. A non-periodic wavefront dividing ring interferometer 30 is discussed in more detail below with respect to FIGS. 5a, 5b, 6.

Figure 3:
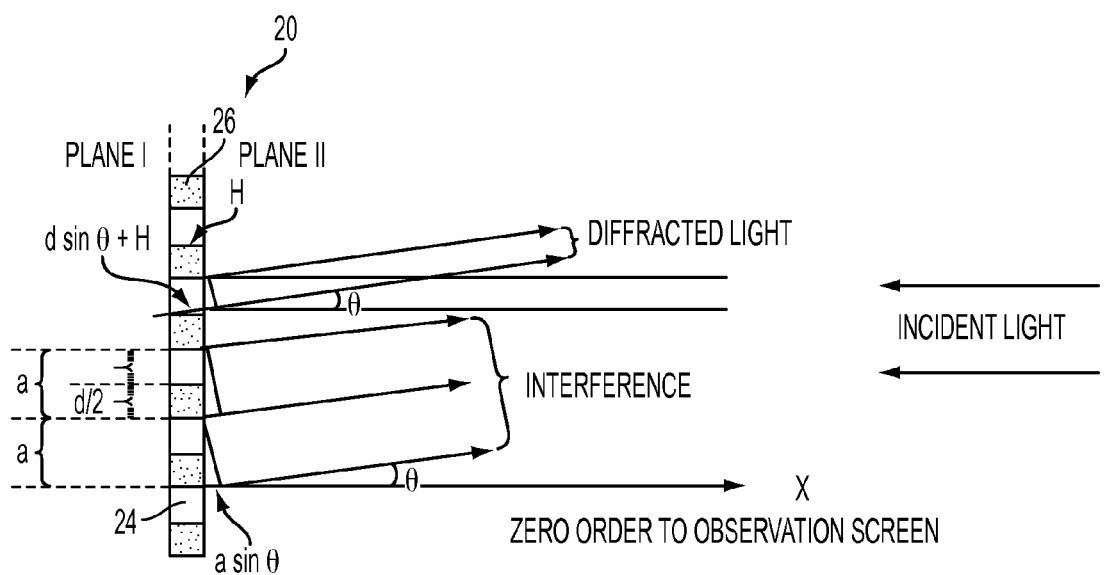
FIG. 3 is a diagram showing light striking a Lamellar grating interferometer.

Turning to FIG. 3, wavefront dividing interferometers produce interferograms by reflecting the incident light from two sets of reflectors displaced with respect to one another. In FIG. 3, a lamellar grating spectrometer 20 is shown. In FIG. 3, the lamellar grating spectrometer 20 receives the incident light and reflects it. The reflection of the incident light produces an optical path difference. The two sets of reflectors 24 and 26 are moved with respect to one another by a specific length increment 1, called the sampling interval. The resolution of the interferometer is determined by the total length L of the interferogram.

In FIG. 3, the interferogram is produced by a combination of the interference and diffraction, which results from the superposition of two light beams reflected from planes I and II. The reflectors 26 reflect light from the front surface in plane I and the reflectors 24 reflect light from the front surface in plane II.

Figure 4A:
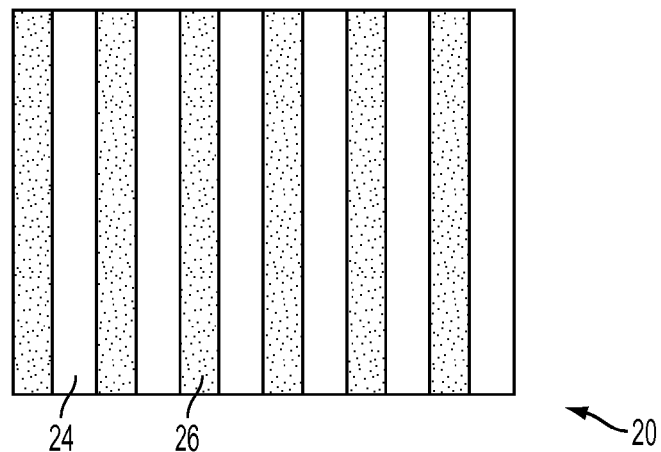
FIG. 4a shows a Lamellar grating interferometer.
Figure 4B:
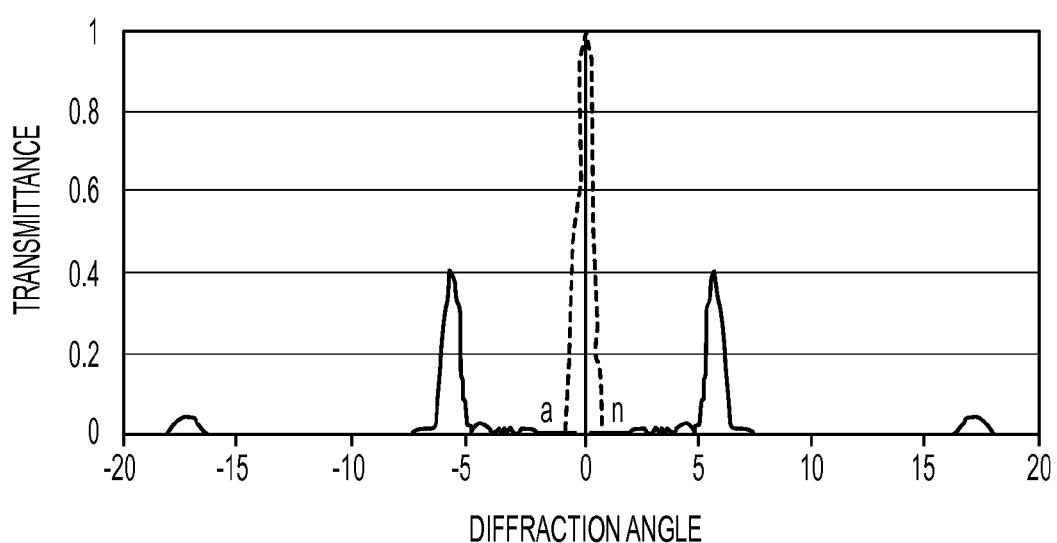
FIG. 4b is a graph of the angular dependence of the diffraction pattern produced by the Lamellar grating when using the interferometer.

FIG. 4a shows a front view of the lamellar grating inteferometer 20. The lamellar grating interferometer 20 has a periodic arrangement of reflectors 24 and 26. That is to say the spacing and area of each of the reflectors 24 and 26 are equal. FIG. 4b is a graph illustrating the angular dependence of the diffraction pattern produced by the Lamellar grating.

Figure 5A:
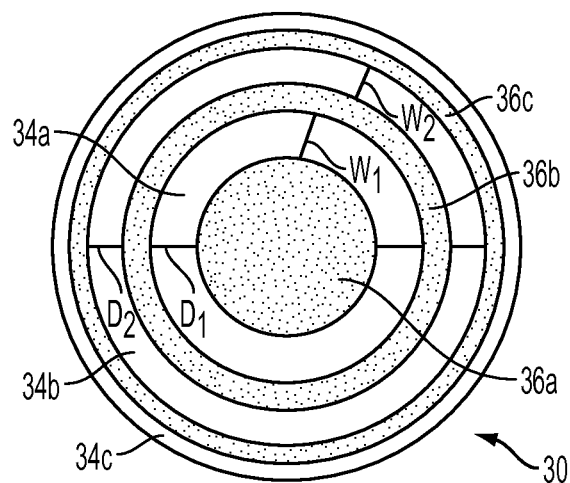
FIG. 5a shows non-periodically arranged reflectors employed in a ring interferometer, in accordance with an embodiment of the present invention.

FIG. 5a shows a front view of the non-periodic reflection means of the ring interferometer 30. The ring interferometer 30 has a first set of reflectors, 34a, 34b and 34c, and a second set of reflectors, 36a, 36b and 36c. The first and second sets of concentric reflectors 34a, 34b, 34c, 36a, 36b, 36c are not periodic. For example, the spacing between reflectors 36a and 36b is not equal to the spacing between reflectors 36b and 36c. This is a consequence of the requirement that the two sets of reflectors, 34a, 34b and 34c and 36a, 36b and 36c, must have the same reflection area for maximum fringe contrast. Since the fixed and moving reflector must each have the same reflecting area, the width of the reflectors decreases as their diameters increase. For example, the diameter $D_1$ of reflector 34a is less than the diameter $D_2$ of reflector 34b, while the width $W_1$ of the reflector 34a is greater than the width $W_2$ of the reflector 34b. Width is measured from the peripheral edge of the reflector to the opposite peripheral edge of the reflector.

Figure 5B:
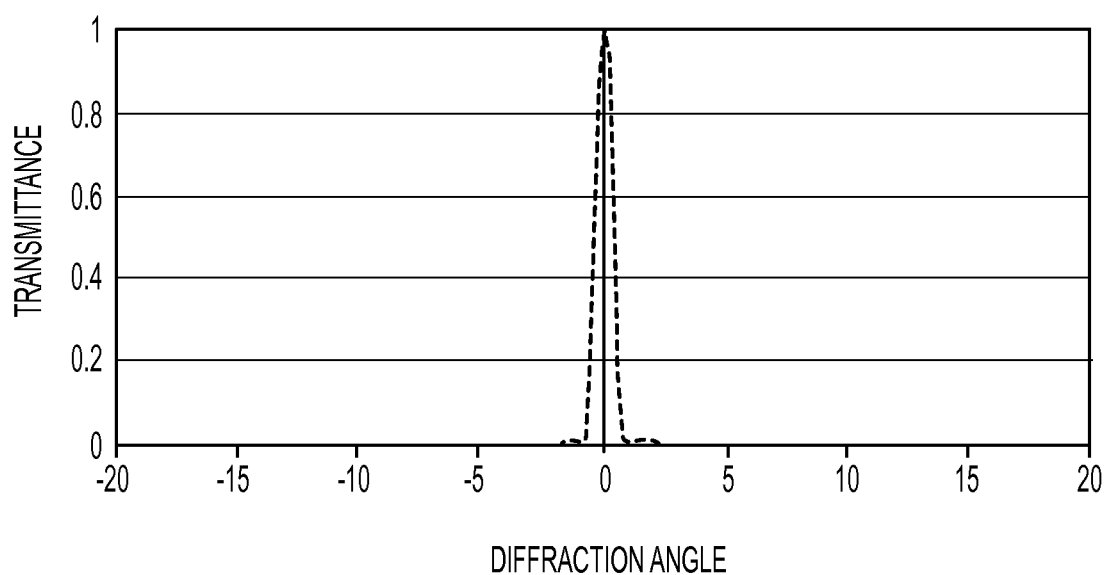

FIG. 5b is a graph illustrating the angular dependence of the diffraction pattern produced by the ring interferometer. The ring interferometer 30 increases the spectral range in which it can be used by employing a non-periodic structure.

Figure 6:
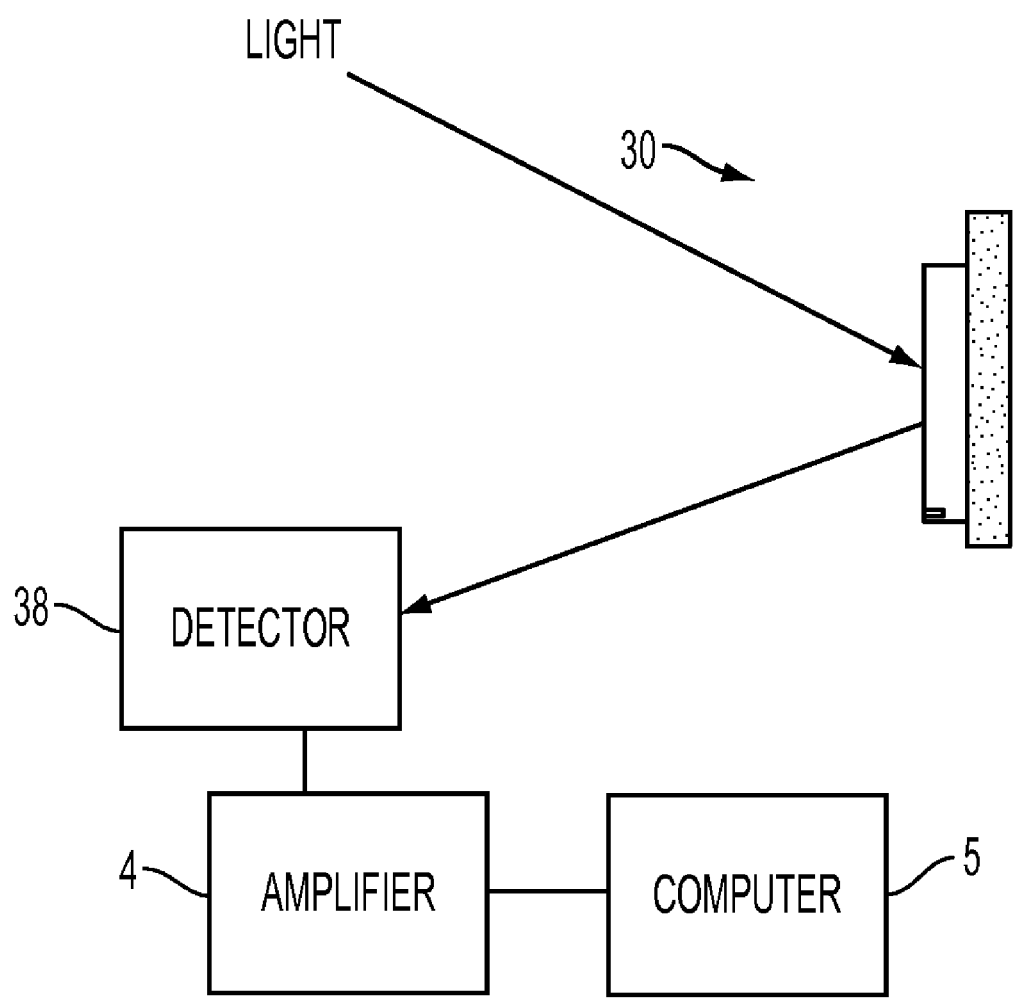
FIG. 6 shows a ring interferometer, in accordance with an embodiment of the present invention.

Referring to FIGS. 5a, 5b, and 6 the light of constructive interference arrives at the center, while the light of destructive interference is diffracted into angles, and prevented from traveling to the center of the detector 38, thereby making modulation possible. The detector 38 is operatively connected to an amplifier 4, and a computer 5 or some other device that can readily perform the computations necessary to calculate the Fourier transformation and analyze the produced interference patterns.

Figure 7:
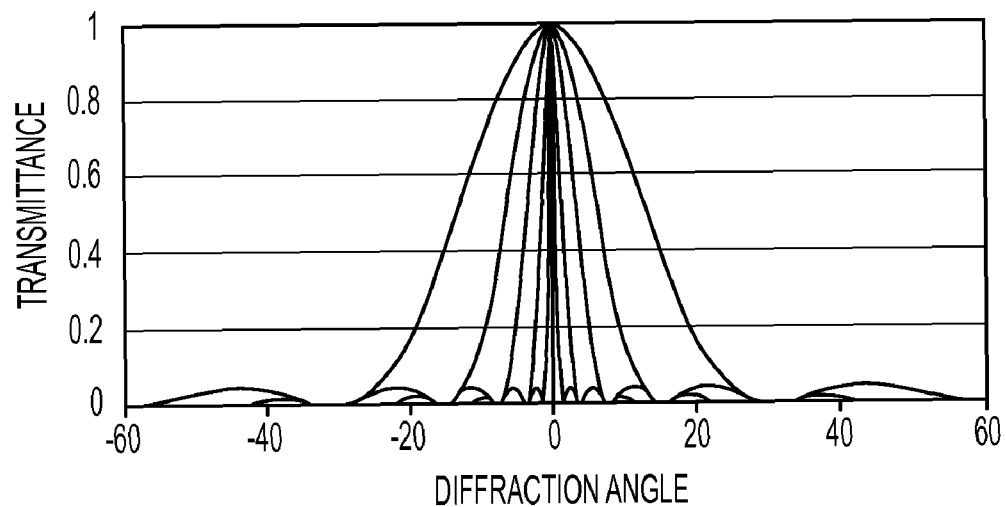
FIG. 7 is a graph of the constructive interference produced by the Lamellar grating.
Figure 8:
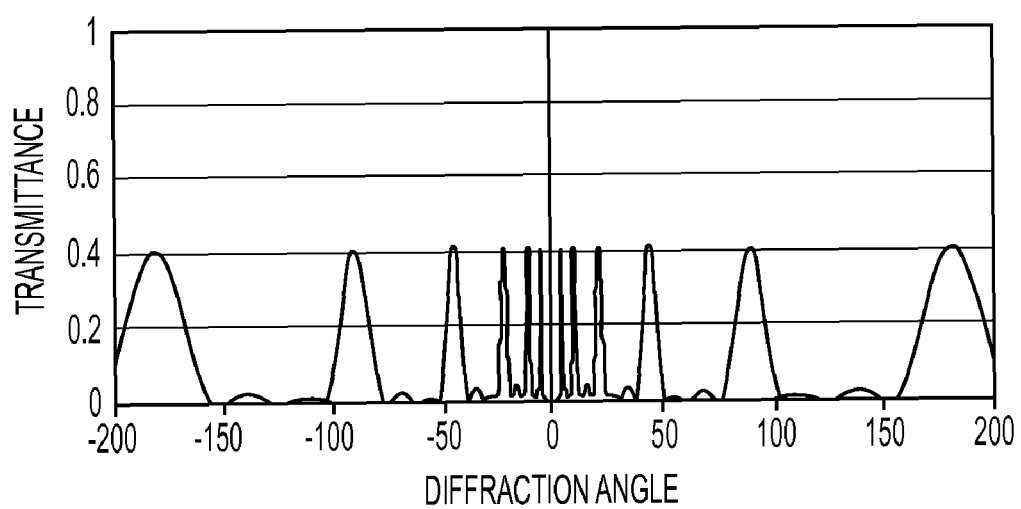
FIG. 8 is a graph of destructive interference produced by the Lamellar grating.

Now turning to FIG. 7, the periodic structure of the lamellar grating interferometer 20 limits the use of the interferometer 20 to a spectral range of three octaves, with the angle range being free of any overlapping of the width of the zero order and the first order of shorter wavelengths. FIG. 7 is a graph showing the constructive interference produced by the Lamellar grating interferometer 20 and FIG. 8 is a graph showing the destructive interference produced by the Lamellar grating interferometer 20.

Figure 9:
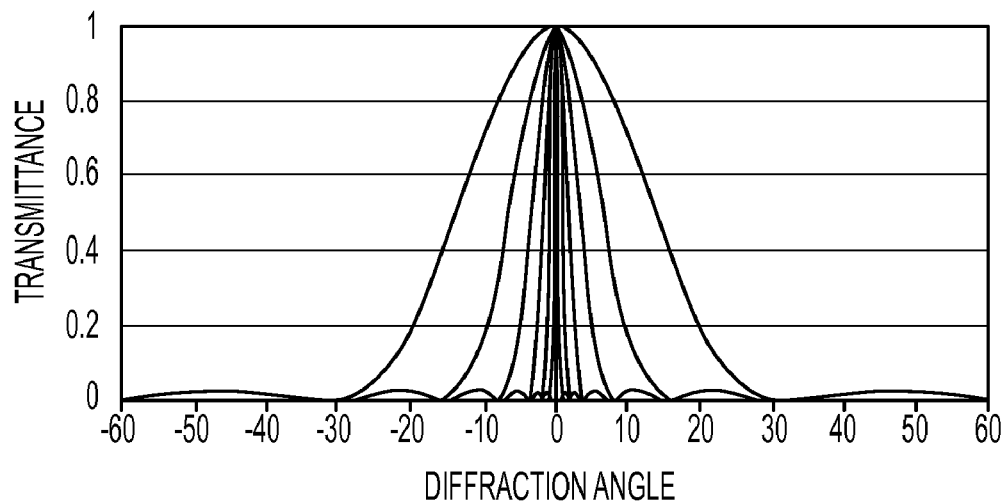
Figure 10:
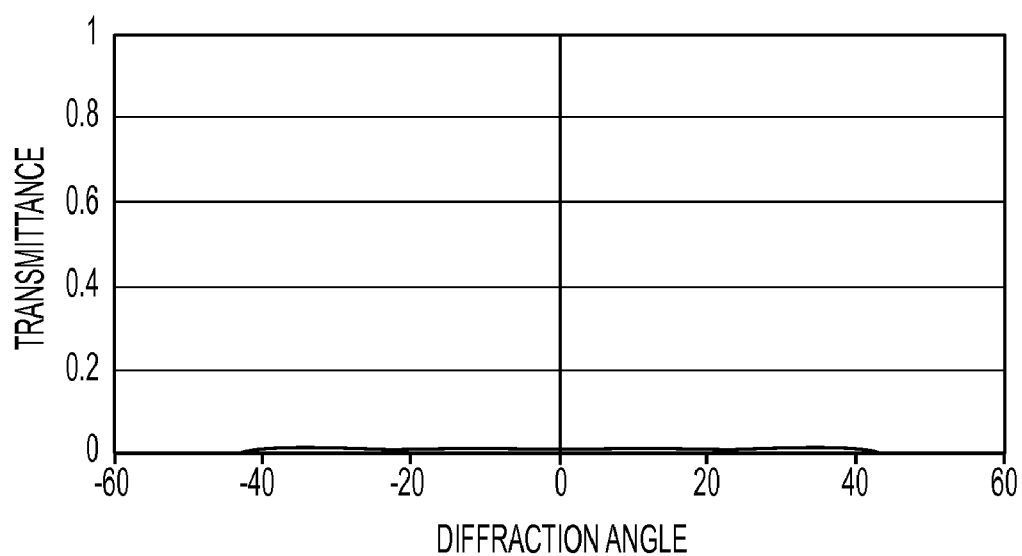

The non-periodic structure of the ring interferometer 30 diffracts the light of destructive interference into a large range of angles. The resulting intensity is very small as shown in FIGS. 9 and 10. FIG. 9 is a graph showing the constructive interference produced by the ring interferometer 30. FIG. 10 is a graph showing the destructive interference produced by the ring interferometer 30. This makes non-periodic reflectors useful over a very large spectral range. The exit aperture of the Lamellar grating interferometer 20 has the disadvantage that the size of the exit aperture depends on the used wavelength range. When switching from a longer wavelength range to shorter, the exit aperture must be made smaller. This is undesirable because it causes the amount of the used infrared light to decrease, and the signal-to-noise ratio worsens. Usage of the non-periodic ring interferometer 30 has the advantage of not requiring any aperture adjustment regardless of the spectral region that is used. The effective aperture in the non-periodic ring interferometer 30 is the diameter of the detector element.

I. Example Comparison

A. Resolution and Modulation of a Ring Interferometer

Figure 1:
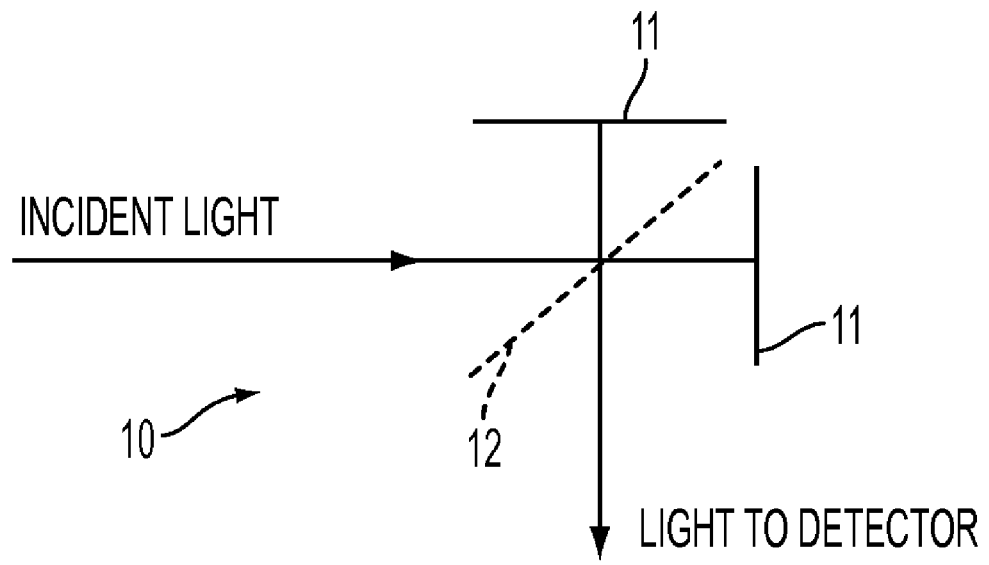
FIG. 1 shows an example of a prior art Michelson FT interferometer.
Figure 1:
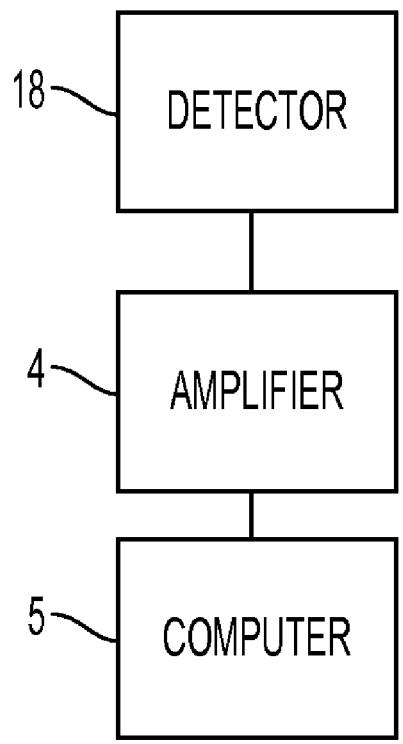
Figure 2:
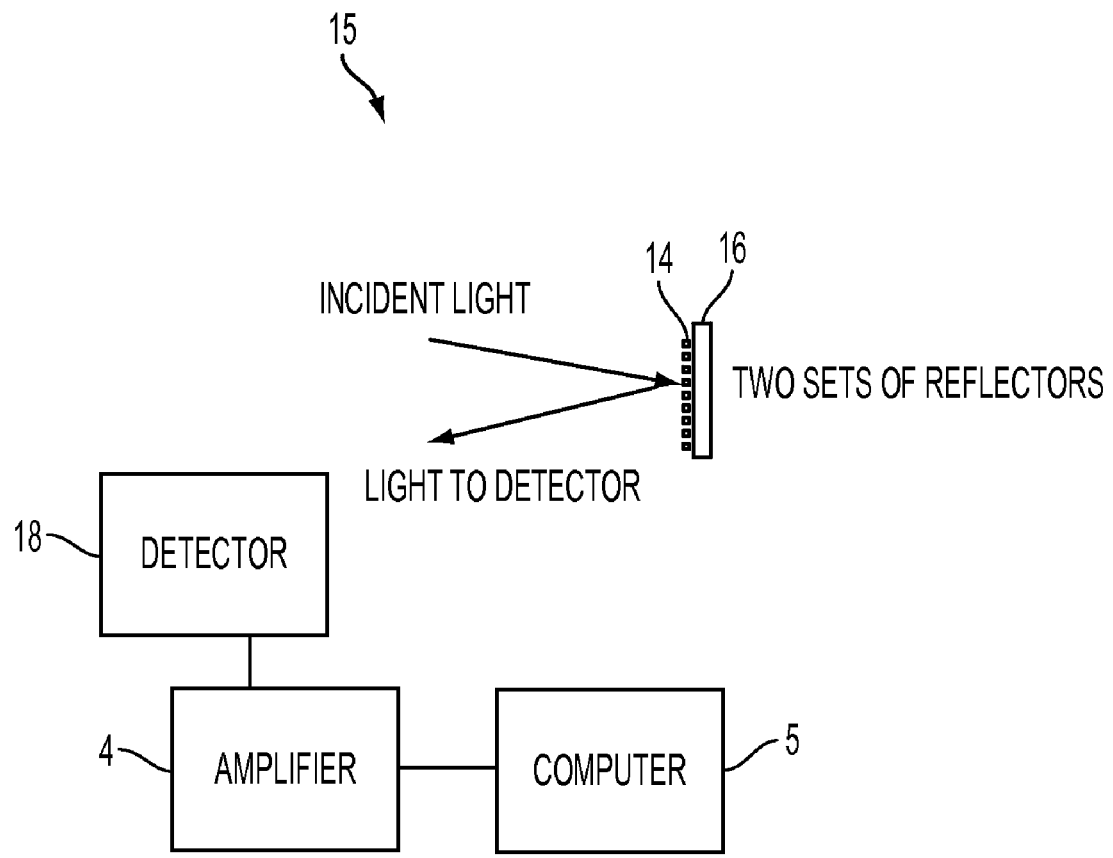
FIG. 2 shows an example of a prior art wave front dividing interferometer.

The resolution of all FT Spectrometers depends on the maximum optical path difference between the interfering beams. A Michelson FT interferometer, such as shown in FIG. 1, produces the optical path difference by the displacement of one mirror 11 with respect to the beamsplitter 12. The wavefront dividing interferometer, such as shown in FIG. 2, produces the optical path difference by the displacement of one set of reflectors 14 with respect to the other set of reflectors 16. When the total displacement length equals to L, the resolution is given as $dv=(\frac{1}{2})L$.

For example: if L=1 cm, then $dv=0.5$ cm$^{-1}$, and if L=10 cm, then $dv=0.05$ cm$^{-1}$ 1. Modulation of Wavefront-Dividing Interferometers The intensity of the incident light in wavefront-dividing interferometers is concentrated for constructive interference at the center of the detector and destructive interference appears outside of the center of the detector. In the Lamellar grating interferometer 20, most of the light of destructive interference is concentrated into the first order. However, when the size of the detector is large enough that for a particular wavelength both constructed and destructed light is recorded, there is no modulation and therefore no interferogram can be recorded.

The ring interferometer 30, in contrast to the Lamellar grating interferometer 20, distributes the light of destructive interference over a large area, and does not limit the modulation. The calculations in the following sections quantitatively illustrate these concepts.

2. Constructive and Destructive Interference

For the ring interferometer 30 having a wavelength range of 20 μm to 640 μm. The wavelengths (mm) are: $\lambda_1$=0.02, $\lambda_2$=0.04, $\lambda_3$=0.08, $\lambda_4$=0.16, $\lambda_5$=0.32, $\lambda_6$=0.64. The distance from the ring interferometer to observation screen is X=4000 mm. The outer radius of the 6 ring reflectors: $a_k$=($\sqrt{k}$)b, k=1, 2 . . . 6, b=20 mm. The transmittance is normalized for constructed interference. The diffraction angle is Y/X and Y on the graph is in mm. Constructive interference is shown in FIG. 9, destructive interference in FIG. 10.

3. Spectral Range

For constructive interference, the incident light appears in the zero order at the center and the width is increasing with the wavelength. The destructive interference light is distributed over a large range of angles and does not affect the fringe contrast in any meaningful manner. The modulation of the ring interferometer is not limited by diffraction into the first order.

B. Resolution and Modulation of the Lamellar Grating Interferometer

The Lamellar grating interferometer 20 has two sets of reflectors 24 and 26, see FIG. 4a. The reflectors 26 are fixed, and the reflectors 24 are moved in steps by the amount of the sampling interval. Superposition of the two beams produces the interferogram at the detector. The wavefront dividing is done by the lamellar grating interferometer 20 and the only critical alignment is for the movement of the two sets of lamellar reflectors 24, 26, with respect to one another, a task much simpler than with the alignment of the Michelson interferometer since there is no beamsplitter used with the lamellar grating interferometer 20. There are fewer parts and the overall size can be made much smaller. Using the appropriate material and some plastic parts, the interferometer can be made to be very lightweight 1. Constructive and Destructive Interference The Lamellar grating interferometer 20 was operated at from 20 μm to 160 μm. The wavelengths (mm) were: $\lambda_1$=0.02, $\lambda_2$=0.04, $\lambda_3$=0.08, $\lambda_4$=0.16, $\lambda_5$=0.32, $\lambda_6$=0.64. Distance from the interferometer to the observation screen: X=4000 mm. Width of the reflector: d=7 mm, Periodicity constant: a=14 mm, Number of periods: 6. The transmittance is normalized for constructed interference. The diffraction angle is Y/X and Y on the graph is in mm. The constructive interference is shown in FIG. 7 and the destructive interference is shown in FIG. 8.

2. Spectral Range

Figure 11:
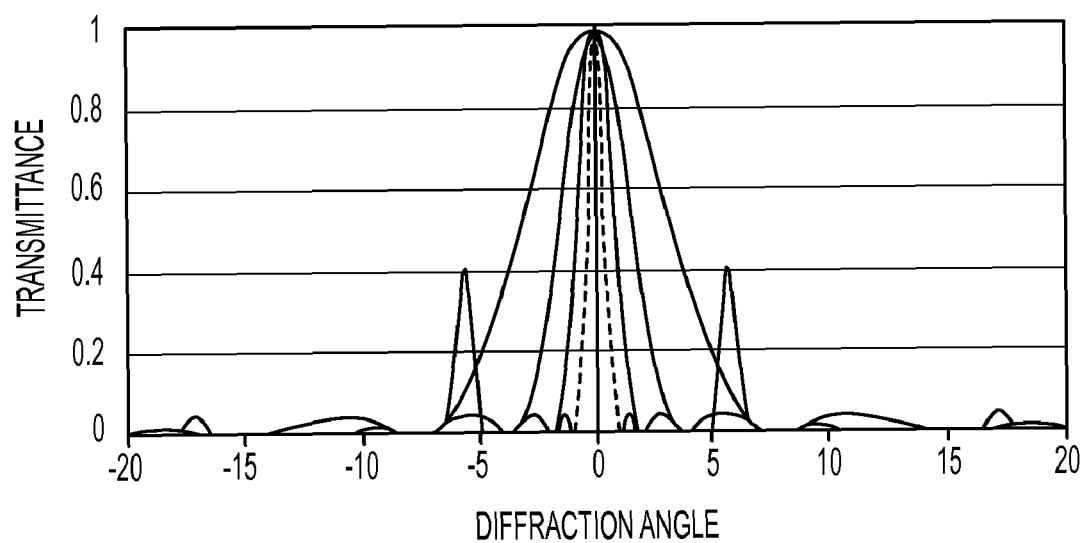
FIG. 11 is a graph of the spectral modulation produced by the Lamellar grating.

For constructive interference, the incident light appears in the zero order at the center. The width is increasing with the wavelength, see FIG. 7. For destructive interference, shown in FIG. 8 the incident light is diffracted into the first order on both sides of the zero order. The first order appears with increasing wavelength at increasing distance from the center. The width of the zero order of 0.16 mm wavelength is overlapping with the first order of the 0.02 mm wavelength. see the dotted line in FIG. 8. FIG. 11 shows the spectral modulation range of the Lamellar grating interferometer 20. If a detector area is large enough that all the light of the zero order of 0.16 mm wavelength is detected, both the zero and first order of the 0.02 mm wavelength arrive at the detector, and the light of 0.02 mm wavelength is not modulated, i.e. there is zero fringe contrast, as shown in FIG. 10.

Another embodiment of the present invention employing non-periodic reflection means involves modifying the amplitude dividing Michelson FT interferometer to be a wavefront dividing interferometer 40. In this embodiment the advantages with respect to interference and from using a non-periodic pattern are applied to the structure of a Michelson FT interferometer. As a consequence, the beamsplitter 42a of the wavefront diving interferometer 40 reflects and transmits 50% of the incident light regardless of the wavelength range under investigation and therefore the beamsplitter 42a does not have to be changed in the critically aligned interferometer. The usage of the beamsplitter 42a also provides a better signal-to-noise ratio than in a conventional Michelson FT interferometer.

By using the beamsplitter 42a as opposed to the ring interferometer 30, a much higher resolution can be achieved that is not limited by the geometric restriction of wavefront-dividing interferometers with movable reflectors. The beamsplitter 42a can work over a broad wavelength range without changing the beamsplitter 42a. The range through which this embodiment may work can be from the microwave range to the infrared range and possibly into the visible light range. However, there is still the drawback of having more parts that are critically aligned and thus the device is less suitable for movement on Earth and on flights than devices with fewer parts requiring critical alignment.

Figure 12:
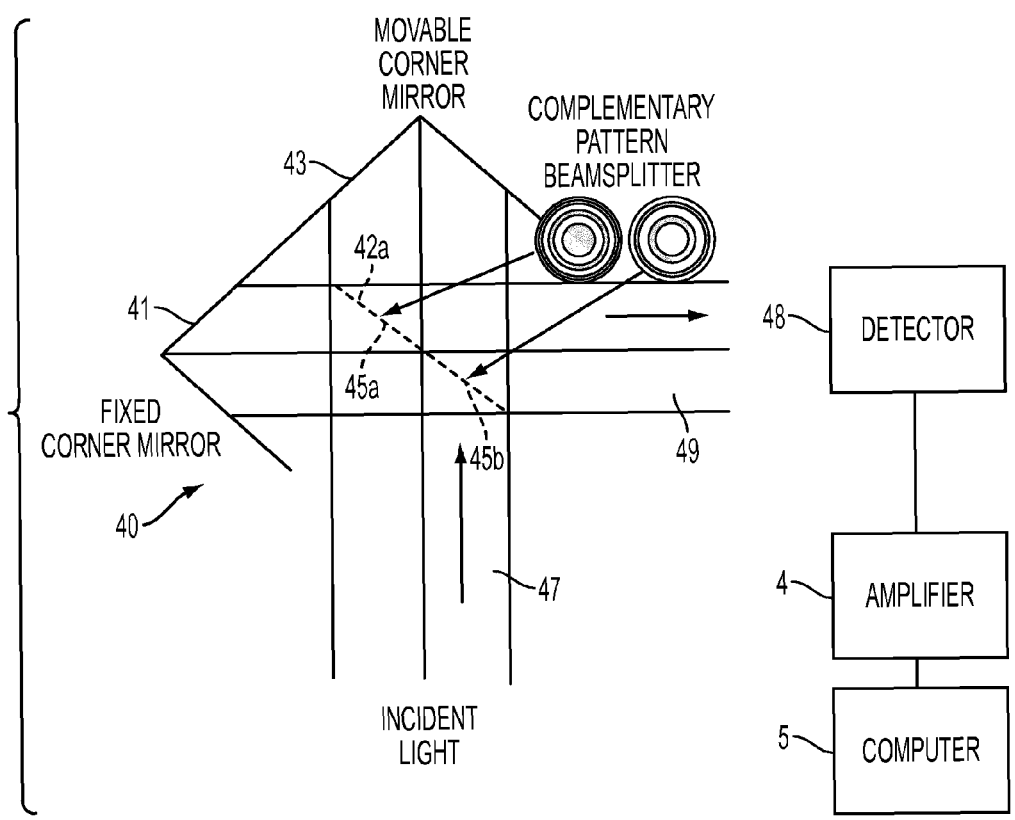
FIG. 12 is an interferometer using the complementary beamsplitter in accordance with an embodiment of the invention.

FIG. 12 shows the optical layout of the wavefront dividing interferometer 40 when used with a wavefront dividing beamsplitter 42a. The input beam of incident light is divided and recombined using a complementary set of Fresnel zone plates; the first zone plate 45a, and the second zone plate 45b operate together as the beamsplitter 42a. Each of the first zone plate 45a and the second zone plate 45b is designed to be half open and half metal. FIG. 12 also shows the fixed corner mirror 41 and the movable corner mirror 43. Incident light from the input beam strikes the beamsplitter 42a and is transmitted to the fixed corner mirror 41 and the movable corner mirror 43, the reflected light is then transmitted to the detector 48. The detector 48 is operatively connected to an amplifier 4, and a computer 5 or some other device that can readily perform the computations necessary to perform the Fourier transformation and analyze the produced interference patterns.

The transmission area of the first zone plate 45a has the same pattern as the reflecting area of the second zone plate 45b and vice-versa. One part of the input beam of the incident light is transmitted by the first zone plate 45a and is reflected by one of the corner mirrors 41, 43, and then reflected by the second zone plate 45b. The other part of the input beam of the incident light is reflected by the first zone plate 45a, reflected by one of the corner mirrors 41, 43, and transmitted by the second zone plate 45b. Both parts of the incident light then travel into the output 49 as the output beam. When the corner mirrors 41, 43 are at the same distance from the center of symmetry, the two parts of the incident light have the same path difference compared to their position at the wavefront of the incident light entering the input 47 and one has the position of zero order interference. Displacement of one mirror with respect to the other in evenly spaced steps produces a signal as a function of the optical path difference, i.e. an interferogram.

The beamsplitter 42a divides and recombines the incident light and achieves the desired 50% reflection and transmission property. Because, unlike dielectric materials, the reflectance of high-conductivity metals is nearly constant from the microwave region through the near infrared (Au or Cu) or through the visible (Ag or Al), this 50% reflection and transmission property holds throughout this spectral range. The light of destructive interference is diffracted into a large angle range regardless of the range of wavelength under investigation. This "complementary pattern" beamsplitter 42a provides a wavefront dividing interferometer 40 that can cover a large spectral region with 50% reflection and transmission. The beamsplitter 42a can be used for a large range of wavelengths and does not require changing within the wavefront dividing interferometer 40.

Figure 13:
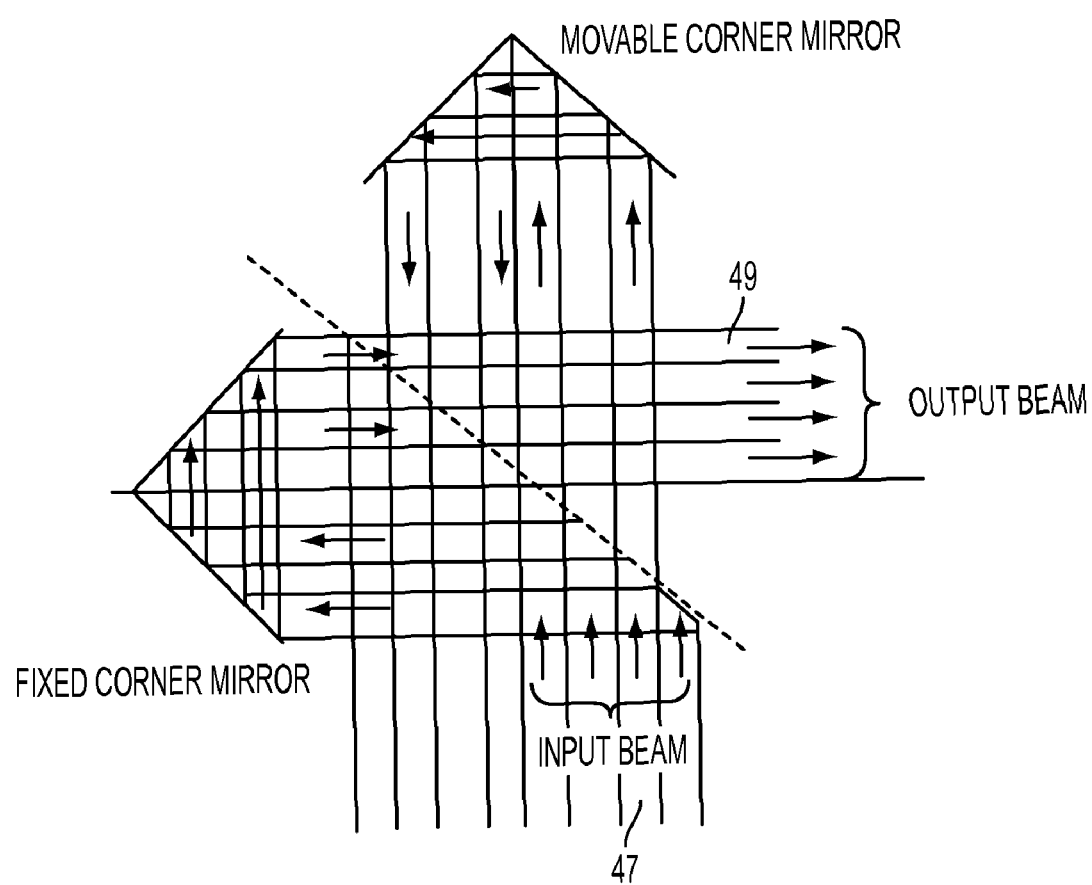
FIG. 13 illustrates the transmission of the light in the interferometer shown in FIG. 12.

FIG. 13 shows the transmission and reflection of the input beams of the incident light prior to recombining into the output beam when using a wavefront dividing beamsplitter 42a.

Figure 14A:
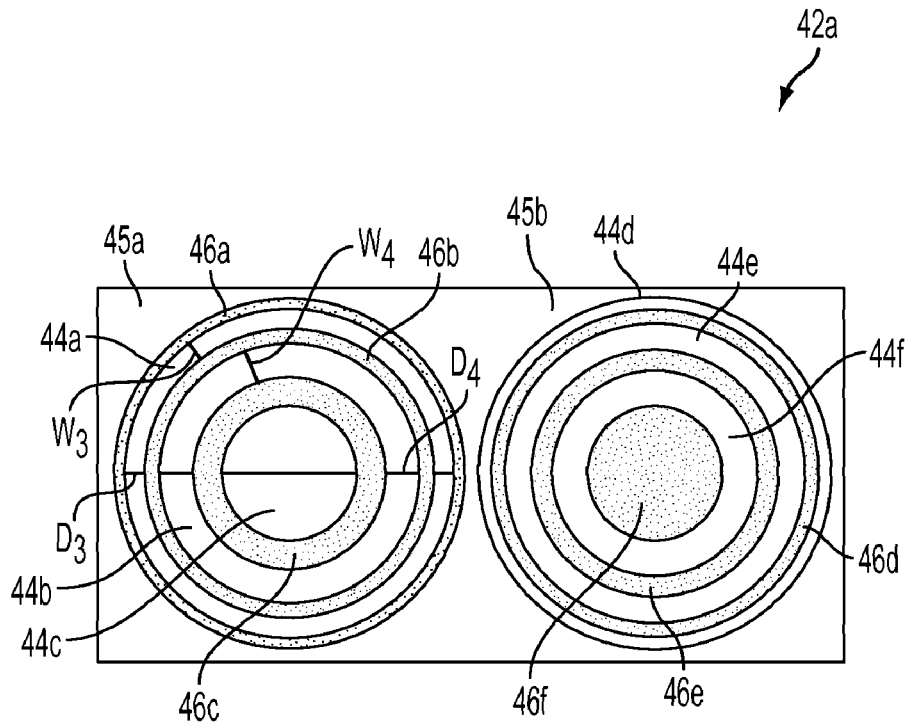
FIG. 14a is the concentric non-periodic beamsplitter used in the interferometer shown in FIG. 12.
Figure 14B:
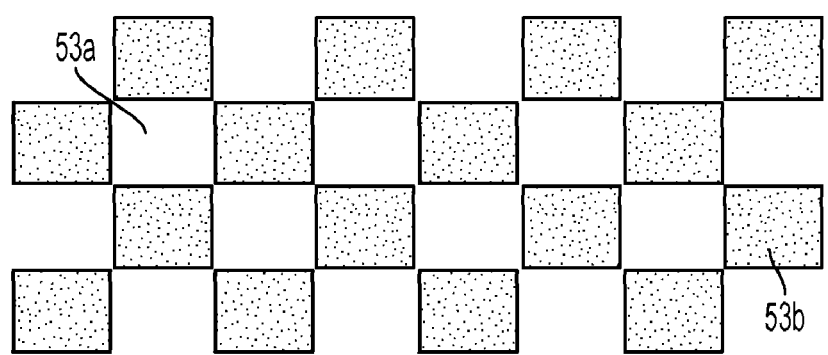
FIG. 14b is a complementary beamsplitter in accordance with an embodiment of the invention.

FIG. 14(a) and FIG. 14(b) show two potential embodiments of the wavefront dividing beamsplitter.

FIG. 14(a) shows a non-periodic beamsplitter 42a that has complementary concentric ring-like structures that form the first zone plate 45a and the second zone plate 45b. While there are three concentric reflection zones per zone plate shown in FIG. 14(a), it should be understood that more or less than three rings may be used. However, use of more than three concentric reflection zones may result in a device that is too fragile, while use of fewer concentric reflection zones would result in a reduced sensitivity. However in the event of the device becoming too fragile, a substrate may be employed in order structurally support the beamsplitter. Similar to what is shown in FIG. 5(a) with respect to the ring interferometer 30, there are number of concentric transmission zones and reflection zones in each of the respective first and second zone plates 45a, 45b. The first zone plate 45a has a number of concentric transmission zones 44a, 44b, 44c and reflection zones 46a, 46b, and 46c that are not periodic. The second zone plate 45b has a number of concentric transmission zones 44d, 44e, and 44f and reflection zones 46d, 46e, and 46f that are the complementary versions of the zones found on the first zone plate 45a and are also non-periodic. Since they are the complementary versions, the area of the transmission zones of the first zone plate 45a is equal to the area of the reflection zones of the second zone plate 45b.

The area of the transmission zones and reflection zones of each zone plate are equal to each other. The spacing between reflection zones 46a and 46b is not equal to the spacing between reflection zones 46b and 46c. This is a consequence of the requirement that the first and second zone plates have reflection and transmission zones, 46a ... 46e and 44a ... 44e have equal area in order to achieve the maximum fringe contrast. For example, the diameter $D_3$ of transmission zone 44a is greater than the diameter $D_4$ of transmission zone 44b, while the width $W_3$ of the transmission zone 44a is less than the width $W_4$ of the transmission zone 44b. Additionally, on the complementary second zone plate 45b, the diameter and width of the reflection zone 46d is equal to the diameter and width of the transmission zone 44a on first zone plate 43a. Width is measured from the peripheral edge of the reflector to the opposite peripheral edge of the reflector.

FIG. 14(b) shows rectangular periodic beamsplitter 42b having a first zone plate 53a and a second zone plate 53b. The rectangular periodic beamsplitter 42b is not non-periodic, however it has two complementary zones, wherein the transmission areas of the first zone plate 53a are in the complementary location to the reflection areas of the second zone plate 53b and vice versa. Since the first zone plate 53a and the second zone plate 53b are complementary, the area of the transmission zones of the first zone plate 53a is equal to the area of the reflection zones of the second zone plate 53b. Other shapes and orientations for the beamsplitter may be used when using a substrate. For example, triangular or circular holes may be employed.

Figure 15:
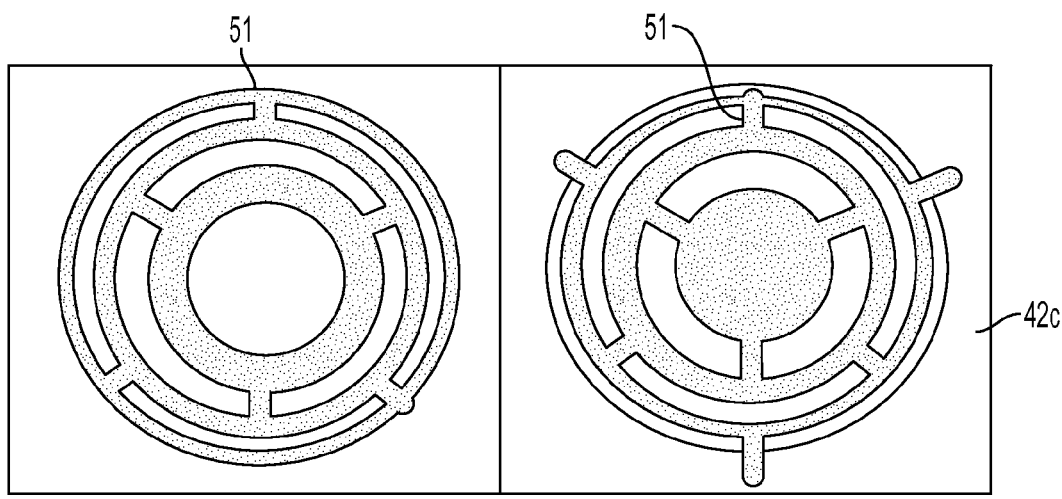
FIG. 15 is a non-periodic beamsplitter that employs struts for structural integrity.

FIG. 15 shows an embodiment of a non-periodic beamsplitter 42c, similar to the beamsplitter 42a discussed above, however beamsplitter 42c is constructed to provide enhanced structural integrity to the rings found within the respective zones. The beamsplitter 42c is constructed as two Fresnel zone plates with a complementary pattern, each modified for mechanical strength via the usage of struts 51 as shown in FIG. 15. Struts 51 are provided within the transmission zones. In the embodiment shown there are three struts within each of the transmission zones each strut 51 is located equidistant from another strut 51 found within the same transmission zone. In the concentric arrangement shown in FIG. 15, each strut 51 is located approximately 120° along the circumference of the circle. The struts 51 may be made from a metal sheet, lapped flat after construction. The struts 51 may also be constructed from the same material from which the beamsplitter 42c is constructed.

There is no preferred metal or material for the construction of either the ring interferometer 30 or the beamsplitter 42a. Preferably the material or metal should be flat and the metal or material should have high reflectivity. For example a metal that could be used would be polished gold or silver. The material should be polished throughout the wavelength range used.

The application of interference and non-periodic diffraction to the construction of reflectors for interferometers produces a rugged interferometer with self aligned reflectors. The usage of non-periodic reflectors for interferometers creates a more efficient device having a smaller beam size that is also lighter than any presently used Michelson interferometer. The interferometer using the non-periodic reflectors would also not require sensitive alignment in order to cover a large spectral range and therefore would be good for remote spectral gathering on earth and in space.

Furthermore, application of the concept of interference and non-periodic diffraction to the construction of a beamsplitter for Michelson interferometers will enable the interferometer to be more efficient by having a 50% reflection and 50% transmission property at all wavelengths. Additionally, the interferometer can be smaller and no change of beamsplitter is necessary when large spectral region needs to be scanned.

This device would allow portable spectral signature detection, remote sensing, detection of chemical and biological agents such as chemical weapons, solvents and chemicals involved in narcotics processing, certain fuels, exotic propulsion systems, gas dynamic laser weapons, and environmental monitoring, in all atmospheric windows.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An interferometer comprising:
    a beamsplitter for receiving light comprising;
        a first zone plate having a first set of transmission zones and a first set of reflection zones;
        a second zone plate, wherein the second zone plate is located adjacent said first zone plate, the second zone plate having a second set of transmission zones and a second set of reflection zones;

a mirror for receiving reflected and transmitted light from the beamsplitter;

a detector for receiving the light from the beamsplitter;

a computer operatively connected to the detector, wherein the computer analyzes interference patterns produced by the light; and wherein the first set of transmission zones transmits the light to the mirror and the light is reflected by the second set of reflection zones and the area of the first set of transmission zones is the same as the area of the second set of reflection zones.

2. The interferometer of claim 1, further comprising a second mirror, and wherein the second set of transmission zones transmits the light to the second mirror and the light is reflected by the first set of reflection zones and the second set of transmission zones has the same area as the first set of reflection zones.

3. The interferometer of claim 2, wherein both the first mirror and the second mirror are corner mirrors.

4. The interferometer of claim 1, wherein the first set of reflection zones and the first set of transmission zones are concentric.

5. The interferometer of claim 1, wherein the areas of each of the first set of reflection zones and the first set of transmission zones are equal.

6. The interferometer of claim 1, wherein the first set of reflection zones comprises a first reflection zone and a second reflection zone, and wherein the diameter of the first reflection zone is greater than the diameter of the second reflection zone.

7. The interferometer of claim 6, wherein the width of the first reflection zone is smaller than the width of the second reflection zone.

8. The interferometer of claim 1, wherein the first set of reflection zones comprises a first reflection zone and a second reflection zone and wherein the width of the first reflection zone is smaller than the width of the second reflection zone.

9. The interferometer of claim 1, further comprising a movable second mirror.

10. The interferometer of claim 1, wherein the first set of reflection zones comprises a first reflection zone and a second reflection zone, wherein a plurality of struts extends between the first reflection zone and the second reflection zone.

11. The interferometer of claim 10, wherein each one of the first set of transmission zones has at least 3 struts.

12. An interferometer comprising:
a first set of reflectors and a second set of reflectors;
wherein the first set of reflectors and the second set of reflectors are not periodic and wherein the second set of reflectors are movably mounted along a common optical path with the first set of reflectors;
a detector for receiving light from the first set of reflectors and the second set of reflectors; and
a computer operatively connected to the detector, wherein the computer analyzes interference patterns produced by the light.

13. The interferometer of claim 12, wherein the first set of reflectors and the second set of reflectors are alternating concentric rings.

14. The interferometer of claim 12, wherein the area of each of the first set of reflectors and the second set of reflectors are equal.

15. The interferometer of claim 12, wherein the first set of reflectors has a plurality of circular reflectors of decreasing diameter.

16. The interferometer of claim 15, wherein the plurality of circular reflectors have an increasing width whereby each circular reflector has about the same area.

17. The interferometer of claim 12, wherein the second set of reflectors has a plurality of circular reflectors of decreasing diameter.

18. The interferometer of claim 17, wherein the plurality of circular reflectors have an increasing width whereby each circular reflector has about the same area.

19. The interferometer of claim 12, wherein the first and second sets of reflectors are concentric with an individual reflector from each set positioned in mutual alternating positions.

20. An interferometer comprising:
non-periodic reflection means for receiving light;
a detector for detecting the light after reflection by the non-periodic reflection means; and
a computer operatively connected to the detector, wherein the computer analyzes interference patterns produced by the light.

21. The interferometer of claim 20, wherein the non-periodic reflection means comprises a first set of reflectors and a second set of reflectors and wherein the first set of reflectors and the second set of reflectors are not periodic.

22. The interferometer of claim 20, wherein the non-periodic reflection means comprises; a beamsplitter for receiving light comprising:
a first zone plate having a first set of transmission zones and a first set of reflection zones;
a second zone plate, wherein the second zone plate is located adjacent said first zone plate, the second zone plate having a second set of transmission zones and a second set of reflection zones.

* * * * *